United States Patent [19]

Ukita et al.

[11] 4,154,709

[45] May 15, 1979

[54] WATER-DISPERSIBLE EPOXY MODIFIED ALKYD RESINS

[75] Inventors: Ryoji Ukita; Asao Isobe; Takao Hirayama; Shigeyoshi Tanaka, all of Hitachi, Japan

[73] Assignee: Hitachi Chemical Company, Ltd., Japan

[21] Appl. No.: 883,706

[22] Filed: Mar. 6, 1978

[51] Int. Cl.$^2$ .................. C09D 3/64; C09D 3/66; C09D 5/02

[52] U.S. Cl. .................. 260/22 EP; 260/29.2 EP; 260/29.2 E; 260/835

[58] Field of Search ............ 260/22 EP, 29.2 EP, 260/29.2 E, 835

[56] References Cited

U.S. PATENT DOCUMENTS

| | | | |
|---|---|---|---|
| 2,999,824 | 9/1961 | Singleton et al. | 260/22 EP |
| 3,098,052 | 7/1963 | Schmitz et al. | 260/22 EP |
| 3,196,119 | 7/1965 | Boller et al. | 260/22 EP |
| 3,437,618 | 4/1969 | Taft | 260/22 |
| 3,442,835 | 5/1969 | Curtice et al. | 260/22 |
| 3,639,315 | 2/1972 | Rodriguez | 260/22 TN |
| 3,730,926 | 5/1973 | Guldenpfennig | 260/22 EP |
| 3,827,993 | 8/1974 | Cunningham et al. | 260/22 EP |

FOREIGN PATENT DOCUMENTS 1173734   12/1969   United Kingdom ............ 260/22 EP Primary Examiner—Ronald W. Griffin
Attorney, Agent, or Firm—Craig & Antonelli

[57] ABSTRACT

A water-dispersible epoxy modified alkyd resin produced by reacting (A) 0–50 parts by weight of oil or oil fatty acid, (B) 10–50 parts by weight of polyhydric alcohol, (C) 0–25 parts by weight of monobasic acid having 6 to 18 carbon atoms, (D) 15–70 parts by weight of polybasic acid having 4 to 10 carbon atoms or its anhydride, (E) 5–25 parts by weight of polyoxyalkylene glycol having a molecular weight of 600 to 20,000, and (F) an epoxy compound, wherein the ratio of the hydroxyl groups to the carboxyl groups in the components (A) through (E) is 0.625–1.8 and the amount of the component (F) is 3–50 parts by weight per 100 parts by weight of the total weight of the components (A) through (E), can provide water-dispersible coatings having improved drying characteristics and water resistance as well as corrosion resistance.

16 Claims, No Drawings

WATER-DISPERSIBLE EPOXY MODIFIED ALKYD RESINS

BACKGROUND OF THE INVENTION

This invention relates to a water-dispersible epoxy modified alkyd resin and production thereof.

In recent years, attention has been given to aqueous coatings which can reduce fire risk and air pollution due to organic solvents in conventional organic solvent type coatings and can prevent the waste of resources due to the use of water as a diluent. But there are many problems to be solved in using the aqueous coatings such as drying of coating films being slow, water resistance of coating films being poor, corrosion resistance of coating films being poor, and the like.

More attention has been given to water-dispersible alkyd resins since the organic solvent content can be reduced remarkably comparing with water-soluble alkyd resins. For producing the water-dispersible alkyd resins, there have been known a method for emulsifying and dispersing by using an emulsifier, and a method for self-dispersing by imparting emulsifiability to the alkyd resin itself. The dispersing method by using an emulsifier can hardly be used practically since water resistance is reduced remarkably due to bad influence of the emulsifier. On the contrary, an alkyd resin produced by using polyoxyethylene glycol as one component of the alkyd resin without using an emulsifier as disclosed in U.S. Pat. Nos. 3,437,618 and 3,442,835 is preferable for preparing aqueous alkyd resin coatings without causing environmental pollution, since an organic solvent is scarcely used, and the amount of amines can be reduced to 50% or less of that used in a conventional water-soluble alkyd resin. But the water-dispersible alkyd resin self-dispersed as mentioned above has various defects in that water resistance and corrosion resistance of the resulting coating films are poor and drying characteristics are also poor when prepared as ordinary-temperature-curable type coatings, comparing with those of the conventional organic solvent type alkyd resin coatings and thus it is not suitable for practical use.

In order to reduce viscosity of aqueous dispersions and to improve drying characteristics when prepared as ordinary-temperature-curable type coatings, U.S. Pat. No. 3,639,315 proposes a process for producing an organic isocyanate modified water-dispersible alkyd resin.

SUMMARY OF THE INVENTION

It is an object of this invention to provide a water-dispersible alkyd resin for preparing coatings which have greatly improved drying characteristics and water resistance of coating films as well as corrosion resistance of coating films without using organic isocyanates. It is another object of this invention to provide a process for producing the water-dispersible epoxy modified alkyd resin.

In accordance with this invention, the water-dispersible epoxy modified alkyd resin can be produced by reacting (A) 0–50 parts by weight of at least one oil or oil fatty acid, (B) 10–50 parts by weight of at least one polyhydric alcohol having 2 to 6 hydroxyl groups in the molecule except for the component (E) mentioned below, (C) 0–25 parts by weight of at least one monobasic acid having 6 to 18 carbon atoms in the molecule, (D) 15–70 parts by weight of at least one polybasic acid having 4 to 10 carbon atoms in the molecule or its anhydride, (E) 5–25 parts by weight of at least one polyoxyalkylene glycol having a molecular weight of 600 to 20,000, and (F) an epoxy compound, wherein the ratio of the hydroxyl groups to the carboxyl groups in the components (A) through (E) is in the range of 0.625 to 1.8, and the amount of the component (F) is 3–50 parts by weight per 100 parts by weight of the total weight of the components (A) through (E).

DETAILED DESCRIPTION OF THE INVENTION

The water-dispersible epoxy modified alkyd resin can be produced by one-step reaction, two-step reaction or three-step reaction.

A preferable example for producing the water-dispersible epoxy modified alkyd resin in the case of using an oil as the component (A) is to react in a first step the component (A), ⅔ to ⅓ of the component (B) and the component (C) under nitrogen at 170°–270° C. with stirring so as to proceed ester exchange while removing water until a suitable acid number is obtained and then to cool the reaction mixture, and subsequently to proceed condensation in a second step by adding the residue of the component (B), the component (D), the component (E) and the component (F) to the reaction mixture and heating at 170°–270° C. under nitrogen with stirring until a suitable acid number and a viscosity are obtained and then to cool the reaction product. Other methods selected from the following reaction methods can also be employed for the production of the water-dispersible epoxy modified alkyd resin. In the case of using at least one oil selected from the group consisting of drying oils, semi-drying oils and non-drying oils as the component (A), the component (E) can be added in at least one step among the first step and the second step as mentioned above or in a third step newly added after the second step, and the component (F) can be added in at least one step among the second step and the newly added third step, in order to carry out the reaction. To add the component (F) in the third step is one of preferable methods. It is preferable to use the component (C) in an amount of 5–25 parts by weight.

In the case of using at least one oil fatty acid selected from the group consisting of fatty acids derived from drying oils, semi-drying oils and non-drying oils and synthetic fatty acids as the component (A), the components (A) through (F) can be reacted in one step, or after reacting the components (A) through (E) in a first step the component (F) can be added to the reaction mixture in a second step. In some cases as well as the above-mentioned methods, the component (E) can be added in at least one step among the first step, the second step and a third step newly added after the second step, and the component (F) can be added in at least one step among the second step and the third step, in order to carry out the reaction. To add the component (F) in the third step is one of preferable methods. It is preferable to use the component (C) in an amount of 5–25 parts by weight.

In the case of using no component (A), the components (B) through (F) can be reacted in one step. Alternatively, while reacting the components (B) through (D) in a first step, the components (E) and (F) can be added in at least one step among the first step and a second step newly added after the first step.

In any case, when the epoxy compound is added in a final step, the alkyd resin produced in the previous step should be adjusted to have a sufficient amount of carboxyl groups to react with the epoxy compound, preferably to have ½ or more equivalent of carboxyl groups based on one equivalent of the epoxy group of the epoxy compound.

In these reaction steps, the reactions can be carried out under nitrogen at a temperature of from 170° to 270° C. The final products are adjusted to have the desired acid number and viscosity.

As the component (A), there can be used oils such as drying oils, semi-drying oils, and non-drying oils, oil fatty acids derived from these oils, and synthetic fatty acids. Examples of the component (A) are tung oil, soya oil, linseed oil, castor oil, dehydrated castor oil, safflower seed oil, cotton seed oil, coconut oil, palm oil, and the like; fatty acids derived from these oils; Versatic Acid (tertiary aliphatic monocarboxylic acid, trade name of shell Chemical Co.); and the like. One or more oils and/or oil fatty acids and/or synthetic fatty acids can be used as the component (A) depending on the desired film properties. The component (A) is used in an amount of 0–50 parts by weight. If the component (A) is used more than 50 parts by weight, hardness of a coating film becomes poor and is insufficient for practical use. If a drying oil, a semi-drying oil, or a fatty acid derived from these oils is used as the component (A), a water-dispersible resin excellent in drying characteristics at ordinary temperature can be obtained. In such a case, it is preferable to use the component (A) in an amount of 20–50 parts by weight.

As the component (B), there can be used such polyhydric alcohols as ethylene glycol, propylene glycol, diethylene glycol, neopentyl glycol, 1,4-butanediol, 1,6-hexanediol, glycerine, dipropylene glycol, trimethylolethane, trimethylolpropane, pentaerythritol, and the like. Among them, trifunctional or higher polyhydric alcohols such as glycerine, trimethylolethane, pentaerythritol and the like are preferable. The component (B) is used in an amount of 10–50 parts by weight. If the amount of the component (B) is less than 10 parts by weight, the resin is easily gelled, and if the amount is more than 50 parts by weight, the alkyd resin having a large molecular weight cannot be obtained and thus the resulting coating film is inferior in film properties, especially in hardness and solvent resistance.

As the component (C), there can be used such aromatic and aliphatic carboxylic acids as benzoic acid, methylbenzoic acid, para-tert-butylbenzoic acid, isodecanoic acid, cyclohexanecarboxylic acid, isooctanoic acid, and the like.

The component (C) is used in an amount of 25 parts by weight or less. If the amount is more than 25 parts by weight, the molecular weight of the resulting alkyd resin becomes unpreferably small.

As the component (D), there can be used such polybasic acids as phthalic acid, isophthalic acid, terephthalic acid, dimethyl terephthalate, tetrahydrophthalic acid, maleic acid, fumaric acid, adipic acid, sebacic acid, dimer acids (dimers of fatty acids), bicyclo-2,2,1-hepten-5-2,3-dicarboxylic acid, trimellitic acid, Het Acid, decane-1,10-dicarboxylic acid, and their acid anhydrides, and the like.

The component (D) is used in an amount of 15–70 parts by weight. If the amount is less than 15 parts by weight, the alkyd resin having a high molecular weight cannot be obtained, and if the amount is more than 70 parts by weight, gellation occurs during the production.

As the component (E), polyalkylene glycols having an average molecular weight of 600–20,000 can be used. If the average molecular weight is less than 600, the effect of the component (E) is very weak, and if the average molecular weight is more than 20,000, solubility with other components becomes poor. Polyoxyalkylene glycols are polymers of glycols having 1 to 4 carbon atoms, and examples of polyoxyalkylene glycols are polyoxyethylene glycol, polyoxypropylene glycol, etc. Polyethylene glycols having an average molecular weight of 1,000–10,000 are preferable. Not only one polyethylene glycol but also two or more polyethylene glycols in combination can be used as the component (E). The component (E) is used in an amount of 5–25 parts by weight. If the amount is less than 5 parts by weight, the resulting alkyd resin does not show water-dispersibility, and if the amount is more than 25 parts by weight, film properties of the resulting alkyd resin coating becomes poor, particularly in water resistance and corrosion resistance.

The components (A) through (E) should be compounded so that the ratio of the hydroxyl groups/the carboxyl groups is in the range of 0.625–1.8/1, preferably 1.0–1.6/1. If the ratio is outside the above-mentioned range, only the alkyd resin having a low molecular weight is obtained and this is unfavorable.

As the component (F), there can preferably be used epoxy resins having two or more epoxy groups per molecule. Preferable examples of the epoxy resins are epoxy resins obtained by reacting aromatic polyols or polyhydroxy compounds such as bisphenol with epihalohydrins, e.g. bisphenol type epoxy resins such as a reaction product of 2,2-bis(4-hydroxyphenyl) propane with an epihalohydrin. Commercially available bisphenol type /epoxy resins are Epikote 828, Epikote 834, Epikote 1001, Epikote 1004, Epikote 1007, Epikote 1009 (trade names, manufactured by Shell Chemical Co.); DER 660, DER 661 J, DER 662, DER 664 J, DER 667 J, DER 668, DER 669 J (trade names, manufactured by The Dow Chemical Co.); EPS 485, EPX 43 (trade names, manufactured by Asahi Denka Kogyo Co.); EPOMIK 300, EPOMIK 301, EPOMIK 304, EPOMIK 307, EPOMIK 309 (trade names, manufactured by Mitsui Kanebo Co.) and the like.

Other alicyclic type epoxy resins such as Yunocks 201

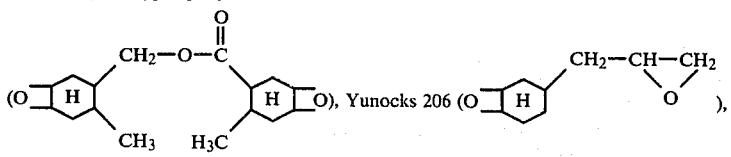

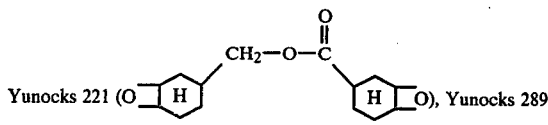

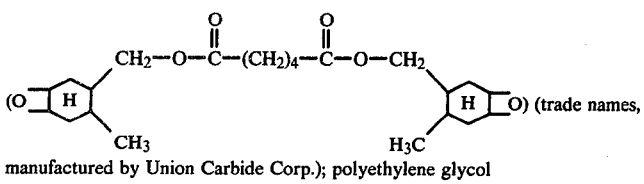

(trade names, manufactured by Union Carbide Corp.); polyethylene glycol type epoxy resins such as Epikote 812

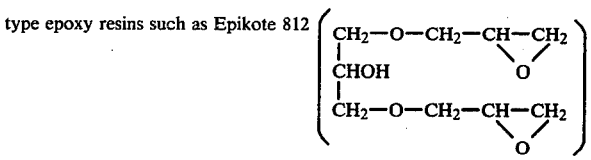

(trade name, manufactured by Shell Chemical Co.); Epolite 40E ($CH_2$—CH—$CH_2$—O—$(CH_2)_2$—O—$CH_2$—CH—$CH_2$), Epolite 200E
\\O/    \\O/

($CH_2$—CH—$CH_2$—O—$(CH_2$—$CH_2$—O$)_4$—$CH_2$—CH—$CH_2$), Epolite 400E
\\O/    \\O/

($CH_2$—CH—$CH_2$—O—$(CH_2$—$CH_2$—O$)_6$—$CH_2$—CH—$CH_2$) (trade names,
\\O/    \\O/ manufactured by Kyoei-sha Co.); epoxidized polybutadienes such as BF-1000 (trade name, manufactured by Adeka Ahgas Kagaku Co.) and the like can also be used.

It is preferable to use epoxy compounds having softening points of 60° C. or more.

The component (F) is used in an amount of 3–50 parts by weight per 100 parts by weight of the total weight of the components (A) through (E). If the amount is less than 3 parts by weight, increasing effects in corrosion resistance, water resistance and drying characteristics if made into an ordinary-temperature-curable type coating cannot be expected, while if the amount is more than 50 parts by weight, there takes place chalking on the coating film when exposed to outdoor. In order to make a cold drying type resin, a drying oil, a semi-drying oil, or a fatty acid derived from these oils is to be used together with epoxy modification so as to impart excellent drying characteristics.

By using various epoxy resins as the component (F), it is possible to increase adhesion to metals, and being caused by increasing an average molecular weight of the alkyd resin by modifying with epoxy resins, it is possible to improve corrosion resistance, water resistance and drying characteristics.

The water-dispersible epoxy modified alkyd resin of this invention can be dispersed in water by neutralizing with ammonium hydroxide, or an amine such as triethylamine, 2-amino-2-methylpropane, monoethanolamine, diethanolamine, triethanolamine, or a hydroxide of alkali metal such as K, Na, etc., among these compounds those which are volatile at ordinary temperature being preferable, followed by addition of water with stirring. The thus obtained dispersed resin can be used for preparing coating compositions.

It is possible to add pigments, dyes, plasticizers, solvents, and other conventional additives to the coating compositions. It is also possible to add water-soluble or water-dispersible resins such as modified amino resins, epoxy resins, polyester resins, acrylic resins, and the like to the coating compositions. The modified amino resins are, for example, water-dispersible or water-thinnable amino resins prepared by reacting an amino compound such as melamine, urea, benzoguanamine, etc. with formaldehyde and modifying with methanol or a mixture of methanol and one or more other alcohols such as ethanol, propanol, butanol, etc. The modified amino resin can be used in an amount of 10–30% by weight based on the weight of the epoxy modified alkyd resin. The use of the water-dispersible epoxy modified alkyd resin in combination with one or more modified amino resins, epoxy resins, and the like is useful for preparing baking coating compositions, the use of the water-dispersible epoxy modified alkyd resin prepared by using a drying oil as the component (A) in combination with a metal dryer such as salts of aliphatic acids, naphthenic acid, octenic acid, etc. or metals such as Co, Mn, Pb, Zr, rare earth metals, etc. is useful for preparing cold cure type coating compositions. The metal dryer can be used in an amount of 0.001–0.5% by weight based on the weight of the epoxy modified alkyd resin. To these coating compositions, conventional pigments, surface treating agents, organic solvents, and the like are added to provide lacquers and varnishes. The coating compositions can be coated on substrates by conventional coating procedures such as dip coating, brush coating, spray coating, roller coating, and the like. As the substrates, wood, paper, fibers, plastics, ceramics, iron, non-ferrous metals, and the like can be used.

This invention will be explained more in detail by way of the following Examples.

EXAMPLE 1

In a 1-liter glass flask equipped with a stirrer, a thermometer, a reflux dehydrating apparatus and an inert gas inlet pipe, were charged 157 g of linseed oil, 73 g of pentaerythritol, and 112 g of para-tert-butylbenzoic acid and heated at 230° C. When an acid number became 15, the flask was cooled. After adding 73 g of pentaerythritol, 168 g of phthalic anhydride, 53 g of polyethylene glycol (molecular weight 3,000), and 32 g of an epoxy resin (Epikote 1001, melting point 64°–74° C., epoxy equivalent 470, molecular weight 900) to the flask, the flask was heated at 230° C. The condensation was proceeded until the acid number became 10. The resulting water-dispersible epoxy modified alkyd resin (200 g) was placed in a beaker made of stainless steel and stirred with 4 g of triethylamine at 80° C. for 5 minutes. Subsequently, 300 g of water was added to give the epoxy modified alkyd resin dispersed in water. The resin had a solid content of 40% and a viscosity of 35 poise at 25° C.

EXAMPLE 2

Using the same flask as used in Example 1, 157 g of linseed oil, 73 g of pentaerythritol, and 112 g of para-tert-butylbenzoic acid were heated at 230° C. until an acid number became 15. After cooling, 73 g of pentaerythritol, 168 g of phthalic anhydride, and 53 g of polyethylene glycol (molecular weight 6,000) were added to the flask. The condensation was proceeded at 230° C. until the acid number became 50. After cooling and adding 62 g of an epoxy resin (Epikote 1001), the condensation was further proceeded at 230° C. until the acid number became 10. The thus produced water-dispersible epoxy modified alkyd resin (200 g) was placed in a beaker made of stainless steel and stirred with 4 g of triethylamine at 80° C. for 5 minutes. Subsequently, 300 g of water was added to give the epoxy modified alkyd resin dispersed in water. The resin had a solid content of 40% and a viscosity of 70 poise at 250° C.

EXAMPLE 3

Using the same procedure as described in Example 1 except for using dehydrated castor oil in place of linseed oil, polyethylene glycol (molecular weight 6,000) in place of polyethylene glycol (molecular weight 3,000) and an epoxy resin (Epikote 1007, melting point 122°–131° C., epoxy equivalent 1900, molecular weight 2,400) in place of the epoxy resin (Epikote 1001), there was obtained the epoxy resin modified alkyd resin dispersed in water. The resin had a solid content of 40% and a viscosity of 50 poise at 25° C.

EXAMPLE 4

Using the same flask as used in Example 1, 192 g of dehydrated castor oil, 100 g of pentaerythritol and 95 g of para-tert-butylbenzoic acid were heated at 230° C. until an acid number became 15. After cooling, 30 g of pentaerythritol, 144 g of phthalic anhydride, and 60 g of polyethylene glycol (molecular weight 4,000) were added to the flask. The condensation was proceeded at 230° C. until the acid number became 60. After cooling and adding 62 g of an epoxy resin (Epikote 1004, melting point 96°–104° C., epoxy equivalent 950, molecular weight 1,400), the condensation was further proceeded at 230° C. until the acid number became 10. The thus obtained water-dispersible epoxy modified alkyd resin (200 g) was placed in a beaker made of stainless steel and stirred with 4 g of triethylamine at 80° C. for 5 minutes. Subsequently 300 g of water was added to give the epoxy modified alkyd resin dispersed in water. The resin had a solid content of 40% and a viscosity of 15 poise at 25° C.

EXAMPLE 5

Using the same flask as used in Example 1, 192 g of dehydrated castor oil, 130 g of pentaerythritol, 95 g of para-tert-butylbenzoic acid, 144 g of phthalic anhydride, and 60 g of polyethylene glycol (molecular weight 4,000) were heated at 180° C. for 1 hour. Then, the temperature was raised to 230° C. When an acid number became 50, the flask was cooled. After adding 62 g of an epoxy resin (Epikote 1001), the flask was heated at 230° C. again. The condensation was proceeded at that temperature until the acid number became 10. The thus obtained water-dispersible epoxy modified alkyd resin (200 g) was placed in a beaker made of stainless steel and stirred with 4 g of triethylamine at 80° C. for 5 minutes. Subsequently 300 g of water was added to give the epoxy modified alkyd resin dispersed in water. The resin had a solid content of 42% and a viscosity of 50 poise at 25° C.

EXAMPLE 6

Using the same flask as used in Example 1, 210 g of dehydrated castor oil, 63.4 g of pentaerythritol, 41.6 g of para-tert-butylbenzoic acid, and 0.1 g of lithium hydroxide were heated at 230° C. for 3 hours. When an acid number became 8, the flask was cooled. Then, 48.3 g of isophthalic acid, 43.5 g of phthalic acid, and 72 g of polyethylene glycol (molecular weight 4,000) were added and the reaction was carried out at 220° C. for 3 hours. When the acid number became 29, the flask was cooled. Subsequently 186 g of an epoxy resin (Epikote 1001) was added and the reaction was carried out at 180° C. for 2.5 hours. The acid number became 2. The thus obtained water-dispersible epoxy modified alkyd resin (100 g) was placed in a beaker made of stainless steel and emulsified at 80° C. by addition of 0.5 g of triethylamine. Thus there was obtained an aqueous dispersion having a solid content of 38.1% and a viscosity of 108.0 poise at 25° C.

EXAMPLE 7

Using the same flask as used in Example 1, 182 g of pentaerythritol, 140 g of para-tert-butylbenzoic acid, 168 g of phthalic anhydride, 70 g of isophthalic acid and 140 g of polyethylene glycol were heated at 180° C. for 1 hour. Then the temperature was raised to 220° C. When an acid number became 50, the flask was cooled. After adding 70 g of an epoxy resin (Epikote 1001), the flask was heated at 220° C. again. The condensation was proceeded at that temperature until the acid number became 20. The thus obtained water-dispersible epoxy modified alkyd resin (200 g) was placed in a beaker made of stainless steel and stirred with 6 g of triethylamine at 80° C. for 5 minutes. Subsequently 300 g of water was added to give the epoxy modified alkyd resin dispersed in water. The resin had a solid content of 41% and a viscosity of 150 poise at 25° C.

COMPARATIVE EXAMPLE 1

Using the same flask as used in Example 1, 157 g of linseed oil, 73 g of pentaerythritol, and 112 g of para-tert-butylbenzoic acid were heated at 230° C. When an acid number became 15, the flask was cooled. After adding 73 g of pentaerythritol, 168 g of phthalic anhydride and 53 g of polyethylene glycol (molecular weight 3,000), the condensation was further proceeded at 230° C. until the acid number became 10. The thus obtained water-dispersible alkyd resin (200 g) was placed in a beaker made of stainless steel and stirred with 4 g of triethylamine at 80° C. for 5 minutes. Subsequently 300 g of water was added to give the alkyd resin dispersed in water. The resin had a solid content of 40% and a viscosity of 5 poise at 25° C.

Coating compositions were prepared by using the alkyd resins obtained in Examples 1 through 6 and Comparative Example 1. Film properties of these coating compositions after being dried at ordinary temperature were as set forth in Table 1. Film properties of coating compositions obtained by mixing modified amino resins and the alkyd resins obtained in Examples 1 and 7 Comparative Example 1 after being baked at a lower temperature were as set forth in Table 2.

manufactured by Htachi Chemical Co., Ltd. having 5.5 methylol groups in average and 5.2 methoxy groups in average per melamine molecule before methylation and having 0.3 residual methylol group in average per molecule after methylation, molecular weight, about 600) was used. Each coating composition was coated on a steel plate treated with bonderite #1077 in 0.5 mm thickness. The coating was baked at 120° C. for 20 minutes.

In Tables 1 and 2, gloss was measured according to JIS K 5400, Erichsen test was carried out according to JIS K 7777, impact test was carried out according to JIS K 5400 and corrosion resistance was tested according to JIS Z 2371. Peeling breadth was evaluated by Table 1

| Run No. | 1 | 2 | 3 | 4 | 5 | 6 | 7 |
|---|---|---|---|---|---|---|---|
| Alkyd resin | Example 1 | Example 2 | Example 3 | Example 4 | Example 5 | Example 6 | Comparative Example 1 |
| Minimum time required for sufficient curing and drying at ordinary temperature (hours) | 8 | 4 | 6 | 20 | 8 | 3 | 48 |
| Film properties | | | | | | | |
| Gloss (60°) (%) | 92 | 90 | 88 | 94 | 85 | 92 | 92 |
| Pencil hardness | B | HB | HB | 2B | HB | 2B | 2B |
| Cross cut test | 100/100 | 100/100 | 100/100 | 100/100 | 100/100 | 100/100 | 100/100 |
| Erichsen test (mm) | >6 | >6 | >6 | >6 | >6 | >6 | >6 |
| Impact test (500 g × cm) | 25 | 25 | 25 | 30 | 20 | 45 | 20 |
| Water resistance (dipped for 30 days) | No change | No change | No change | Almost no change (Gloss deceased slightly) | No change | No change | Gloss vanished |
| Corrosion resistance (salt spray for 10 days) | Rust was generated slightly Peeling breadth: 5–10 mm | No change | Rust was generated slightly Peeling breadth: 5–10 mm | Rust was generated slightly Peeling breadth: 5–10 mm | Rust was generated slightly Peeling breadth: 5–10 mm | No change | Rust was generated remarkably Peeling breadth: whole surface (20 mm) |

In Table 1, the coating composition were prepared by mixing alkyd resin (as a solid)/titanium white/24% lead naphthenate/12% cobalt naphthenate in a weight ratio of 50/50/0.25/0.025. Each coating composition was coated on a steel plate treated with bonderite #144 in 0.8 mm thickness. The coating was dried at ordinary temperature for 14 days for measuring film properties.

Table 2

| Run No. | 1 | 2 | 3 |
|---|---|---|---|
| Alkyd resin | Example 1 | Example 7 | Comparative Example 1 |
| Film properties | | | |
| Gloss (60°) (%) | 95 | 98 | 95 |
| Pencil hardness | H | 2H | H |
| Cross cut test | 100/100 | 100/100 | 100/100 |
| Enrichsen test (mm) | >6 | 5.3 | >6 |
| Impact test (500 g × cm) | 35 | 30 | 35 |
| Water resistance (dipped for 30 days) | No change | No change | Hardly changed (Gloss decreased slightly) |
| Corrosion resistance (salt spray for 3 days) | No change | No change | Rust was generated remarkably. Peeling breadth: wole surface (20 mm) |

In Table 2, the coating compositions were prepared by mixing alkyd resin (as a solid)/methylated melamine resin/titanium white in a weight ratio of 80/20/10. As the methylated melamine resin, Melan 242 (trade name, peeled breadth of the coating film when the coating film was peeled by an adhesive cellophane tape of 20 mm wide along a line cut by a blade. Cross cut test was carried out according to a conventional method, i.e. residual numbers of squares per 100 squares, which had been made by cutting the coating film with a blade at intervals of 1 mm crosswise, was counted after peeling the 100 squares with an adhesive cellophane tape. Water resistance was evaluated by observing the surface state with the naked eye after dipping a test plate in water for 30 days.

As is clear from the above results, the waterdispersible epoxy modified alkyd resin of this invention can provide water dispersing type coating compositions excellent in corrosion resistance and water resistance as well as cold (ordinary-temperature) drying type coating compositions excellent in drying characteristics.

What is claimed is:

1. A water-dispersible epoxy modified alkyd resin produced by reacting
    (A) 0–50 parts by weight of at least one oil or oil fatty acid,
    (B) 10–50 parts by weight of at least one polyhydric alcohol having 2 to 6 hydroxyl groups in the molecule except for the component (E) mentioned below,
    (C) 0–25 parts by weight of at least one monobasic acid having 6 to 18 carbon atoms in the molecule, (D) 15–70 parts by weight of at least one polybasic acid having 4 to 10 carbon atoms in the molecule or its anhydride, (E) 5–25 parts by weight of at least one polyoxyalkylene glycol having a molecular weight of 600 to 20,000 and (F) an epoxy compound wherein the ratio of the hydroxyl groups to the carboxyl groups in the components (A) through (E) is in the range of 0.625 to 1.8/1 and the amount of the component (F) is 3–50 parts by weight per 100 parts by weight of the total weight of the components (A) through (E).

2. A water-dispersible epoxy modified alkyd resin according to claim 1, wherein the epoxy compound is a reaction product of an aromatic polyol with an epihalohydrin having two or more epoxy groups per molecule.

3. A water-dispersible epoxy modified alkyd resin according to claim 2, wherein the aromatic polyol is 2,2-bis(4-hydroxyphenyl) propane.

4. A water-dispersible epoxy modified alkyd resin according to claim 1, wherein 20–50 parts by weight of a drying oil or semi-drying oil or a fatty acid derived from these oils is used as the component (A).

5. A water-dispersible epoxy modified alkyd resin according to claim 1, wherein 20–50 parts by weight of a drying oil or semi-drying oil or a fatty acid derived from these oils is used as the component (A) and 5–25 parts by weight of polyoxyalkylene glycol having an average molecular weight of 1,000–10,000 is used as the component (E).

6. A water-dispersible epoxy modified alkyd resin according to claim 4 or 5, wherein linseed oil, dehydrated castor oil or dehydrated castor oil fatty acid is used as the component (A).

7. A water-dispersible epoxy modified alkyd resin according to claim 1, wherein the component (B) is pentaerythritol.

8. A water-dispersible epoxy modified alkyd resin according to claim 1, wherein the component (E) is polyoxyethylene glycol.

9. A water-dispersible epoxy modified alkyd resin according to claim 1, wherein the reactants reacted to produce the resin essentially of 0–50 parts by weight of component (A), 10–50 parts by weight of component (B), 0–25 parts by weight of component (C), 15–70 parts by weight of component (D), 5–25 parts by weight of component (E) and 3–50 parts by weight per 100 parts by weight of the total weight of components (A) through (E) of component (F).

10. A water-dispersible epoxy modified resin according to claim 1, wherein the reactants reacted to produce the resin consist of 0–50 parts by weight of component (A), 10–50 parts by weight of component (B), 0–25 parts by weight of component (C), 15–70 parts by weight of component (D), 5–25 parts by weight of component (E) and 3–50 parts by weight per 100 parts by weight of the total weight of components (A) through (E) of component (F).

11. A water-dispersible epoxy modified alkyd resin according to claim 1, wherein the component (F) is an epoxy resin having two or more epoxy groups per molecule.

12. A water-dispersible epoxy modified alkyd resin according to claim 1, wherein the component (F) is an epoxy resin obtained by reacting an aromatic polyol or polyhydroxy compound with an epihalohydrin, an alicyclic epoxy resin, a polyethylene glycol epoxy resin, or an epoxidized polybutadiene.

13. A water-dispersible epoxy modified alkyd resin according to claim 12, wherein the component (F) is an epoxy resin obtained by reacting an aromatic polyol or polyhydroxy compound with an epihalohydrin or a polyethylene glycol epoxy resin.

14. A coating composition dispersed in water comprising the water-dispersible epoxy modified alkyd resin of claim 1 dispersed in water.

15. Use of a water-dispersible epoxy modified alkyd resin of claim 1 for preparing a coating composition dispersed in water.

16. A method of preparing a coating composition dispersed in water comprising dispersing the water-dispersible epoxy modified alkyd resin of claim 1 in water.

* * * * *